(12) United States Patent
Zheng et al.

(10) Patent No.: US 11,823,405 B1
(45) Date of Patent: Nov. 21, 2023

(54) THREE-DIMENSIONAL MEASUREMENT METHOD AND RELATED APPARATUS

(71) Applicant: GUANGDONG UNIVERSITY OF TECHNOLOGY, Guangzhou (CN)

(72) Inventors: Zhuojun Zheng, Guangzhou (CN); Jian Gao, Guangzhou (CN); Lanyu Zhang, Guangzhou (CN); Haixiang Deng, Guangzhou (CN); Yun Chen, Guangzhou (CN); Xin Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/154,557

(22) Filed: Jan. 13, 2023

(30) Foreign Application Priority Data

Jun. 8, 2022 (CN) .......................... 202210644793.5

(51) Int. Cl.
*G06T 7/521* (2017.01)
*G01C 3/02* (2006.01)

(52) U.S. Cl.
CPC ............... *G06T 7/521* (2017.01); *G01C 3/02* (2013.01); *G06T 2207/10028* (2013.01)

(58) Field of Classification Search
None
See application file for complete search history.

(56) References Cited

U.S. PATENT DOCUMENTS 5,303,032 A * 4/1994 Uesu ...................... G01N 21/63
359/300
6,075,605 A * 6/2000 Futamura ........... G01B 11/2518
250/559.22

(Continued)

FOREIGN PATENT DOCUMENTS

CN 102322823 A 1/2012
CN 107490348 A 12/2017

(Continued)

OTHER PUBLICATIONS

Li Jie et al., "Phase Unwrapping Algorithm for Structured Light Based on Fringe-Order Encoding and Modulation", Acta Optica Sinica, vol. 42, No. 9, May 10, 2022.

*Primary Examiner* — Arleen M Vazquez
*Assistant Examiner* — Brandon J Becker

(57) ABSTRACT

A three-dimensional measurement method comprises: converting a total number of levels of sawtooth fringes into a Gray code and acquiring a sawtooth slope coefficient; fusing the coefficient into a sawtooth fringe image to generate a target sawtooth fringe pattern; projecting each target sawtooth fringe pattern to a surface of a to-be-measured object through a projector, and collecting a deformed target sawtooth fringe pattern on the surface through a camera; solving a Gray code of each sawtooth fringe collection pattern at each pixel point according to a differential property of adjacent pixels in each sawtooth fringe collection pattern and solving a fringe level and a wrapped phase at each pixel point; calculating an absolute phase at each pixel point (Continued)

according to the fringe level and the wrapped phase at each pixel point, and reconstructing a three-dimensional point cloud through triangulation ranging to obtain a three-dimensional model of the to-be-measured object.

7 Claims, 2 Drawing Sheets

(56) References Cited

U.S. PATENT DOCUMENTS

| | | | |
|---|---|---|---|
| 7,545,516 B2* | 6/2009 | Jia | G01B 11/2527 356/604 |
| 2002/0141065 A1* | 10/2002 | Cowan | G02B 5/0221 359/572 |
| 2011/0080471 A1* | 4/2011 | Song | G06T 7/521 356/627 |
| 2012/0237112 A1* | 9/2012 | Veeraraghavan | G06T 7/521 382/154 |
| 2016/0182889 A1* | 6/2016 | Olmstead | H04N 19/17 348/47 |
| 2016/0284102 A1* | 9/2016 | Yoshikawa | G06T 5/00 |
| 2017/0241767 A1* | 8/2017 | Miyata | G06T 7/73 |

FOREIGN PATENT DOCUMENTS

| | | |
|---|---|---|
| CN | 109974626 A | 7/2019 |
| CN | 111724362 A | 9/2020 |
| CN | 112146596 A | 12/2020 |
| CN | 113028989 A | 6/2021 |
| CN | 114234849 A | 3/2022 |
| JP | 2018054410 A | 4/2018 |

* cited by examiner

US 11,823,405 B1

THREE-DIMENSIONAL MEASUREMENT METHOD AND RELATED APPARATUS

CROSS REFERENCE TO RELATED APPLICATIONS

This application claims foreign priority of Chinese Patent Application No. 202210644793.5, filed on Jun. 8, 2022 in the China National Intellectual Property Administration, the disclosures of all of which are hereby incorporated by reference.

TECHNICAL FIELD

The present application relates to the field of three-dimensional measurement technologies, and particularly to a three-dimensional measurement method and a related apparatus.

BACKGROUD OF THE PRESENT INVENTION

Structured light measurement technology has the advantages of non-contact, full-field lossless measurement, high accuracy, high speed, and the like, and has been widely used in industrial detection, machine vision, digitization of cultural relics, medicine and other fields. In an existing structured light measurement system, a structured light three-dimensional measurement system consisting of a camera and a projector is widely used due to a simple structure, a high efficiency of point cloud reconstruction and other advantages. In a typical single-camera structured light three-dimensional measurement system, a projection apparatus projects a coded fringe pattern to a surface of a to-be-measured object, and meanwhile, a camera is used to photograph a grating image deformed by height modulation of the to-be-measured object. Then, phase information representing a height of the object is calculated by processing the deformed fringe image. Finally, three-dimensional information of the to-be-measured object is obtained by a triangle principle according to the phase information and calibrated system parameters.

In the prior art, structured light is often coded by spatial coding and time coding. The spatial coding has a few of projection patterns, may be used for measuring dynamic scenes, but has a relatively low spatial resolution. The time coding can obtain high spatial resolution and measurement accuracy, but needs a plurality of projection patterns, thus being suitable for static scenes. A commonly used time coding method comprises a sinusoidal phase-shift coding method, and the coding method has a high sampling density, needs a lot of tangent and arctangent calculations when solving an absolute phase, and has a low processing speed.

SUMMARY OF PRESENT INVENTION

The present application provides a three-dimensional measurement method and a related apparatus for improving the technical problems of low solution accuracy of an absolute phase in an existing space coding method and low processing speed in a time coding method.

In view of this, a first aspect of the present application provides a three-dimensional measurement method, which comprises:

converting a total number of levels of sawtooth fringes in each sawtooth fringe image into a Gray code, and acquiring a sawtooth slope coefficient of each sawtooth fringe according to each bit code value in the Gray code;

fusing the sawtooth slope coefficient into the sawtooth fringe image to generate a plurality of target sawtooth fringe patterns fused with the Gray code, wherein the target sawtooth fringe pattern is:

$$I_n(u, v) = A(u, v) + B(u, v) \times \{g_n(u, v) \times k_n(u, v) \times \varphi(u, v) + b_n(u, v)\};$$

wherein $I_n(u, v)$ is an $n^{th}$ target sawtooth fringe pattern, (u, v) is pixel point coordinates, $A(u, v)$ is an average intensity, $B(u, v)$ is a modulation intensity, $g_n(u, v)$ is a sawtooth slope coefficient of a sawtooth fringe of an $n^{th}$ sawtooth fringe image, $k_n(u, v)$ is a slope of a sawtooth fringe of the $n^{th}$ target sawtooth fringe pattern, $$\varphi(u, v) = \left[\text{mod}(u, T) - \frac{T}{2}\right]$$

is a modulated phase of the target sawtooth fringe pattern, $\text{mod}(\cdot)$ is a complementary function, T is a number of pixels of a single-period fringe of the sawtooth fringe image, and $b_n(u, v)$ is a basic offset of the sawtooth fringe of the $n^{th}$ target sawtooth fringe pattern;

projecting each target sawtooth fringe pattern to a surface of a to-be-measured object through a projector, and collecting a deformed target sawtooth fringe pattern on the surface of the to-be-measured object through a camera, so as to obtain a sawtooth fringe collection pattern;

solving a Gray code of each sawtooth fringe collection pattern at each pixel point according to a differential property of adjacent pixels in each sawtooth fringe collection pattern;

solving a fringe level and a wrapped phase at each pixel point through the Gray code of each sawtooth fringe collection pattern at each pixel point and each sawtooth fringe collection pattern;

calculating an absolute phase at each pixel point according to the fringe level and the wrapped phase at each pixel point; and reconstructing a three-dimensional point cloud through triangulation ranging based on the absolute phase at each pixel point, so as to obtain a three-dimensional model of the to-be-measured object.

Optionally, the acquiring the sawtooth slope coefficient of the sawtooth fringe according to each bit code value in the Gray code, comprises:

acquiring the sawtooth slope coefficient of the sawtooth fringe through a conversion formula according to each bit code value in the Gray code, wherein the conversion formula is:

$$g_n(u, v) = \begin{cases} 1, & DtoG\left[\text{Floor}\left(\frac{u}{T}\right), n\right] = 0 \\ -1, & DtoG\left[\text{Floor}\left(\frac{u}{T}\right), n\right] = 1 \end{cases};$$

wherein (u, v) is pixel point coordinates, $g_n(u, v)$ is the sawtooth slope coefficient of the sawtooth fringe of the $n^{th}$ sawtooth fringe image, $DtoG[\cdot, n]$ is an $n^{th}$ bit code value in the Gray code of the total number of levels converted from a decimal number, and $\text{Floor}(\cdot)$ is a rounding function.

Optionally, the solving the Gray code of each sawtooth fringe collection pattern according to the differential property of adjacent pixels in each sawtooth fringe collection pattern, comprises:

acquiring a differential result of each sawtooth fringe collection pattern at each pixel point according to the differential property of adjacent pixels in each sawtooth fringe collection pattern; and performing binarization on the differential result of each sawtooth fringe collection pattern at each pixel point, so as to obtain the Gray code fused into each sawtooth fringe collection pattern at each pixel point.

Optionally, the solving the fringe level and the wrapped phase at each pixel point through the Gray code of each sawtooth fringe collection pattern at each pixel point and each sawtooth fringe collection pattern, comprises:

converting the Gray code of each sawtooth fringe collection pattern at each pixel point into the decimal number, so as to obtain the fringe level of each sawtooth fringe collection pattern at each pixel point;

acquiring the sawtooth slope coefficient of each sawtooth fringe collection pattern at each pixel point according to the Gray code of each sawtooth fringe collection pattern at each pixel point; and combining the sawtooth slope coefficient of each sawtooth fringe collection pattern at each pixel point with each sawtooth fringe collection pattern to form an equation set, so as to obtain the wrapped phase at the pixel point by solving the equation set.

Optionally, a calculation formula of the absolute phase is:

$$U(x, y) = \varphi'(x, y) + K(x, y) \times T + \frac{T}{2};$$

wherein $U(x, y)$ is an absolute phase at a pixel point $(x, y)$, $\varphi'(x, y)$ is a wrapped phase at the pixel point $(x, y)$, and $K(x, y)$ is a fringe level at the pixel point $(x, y)$.

A second aspect of the present application provides a three-dimensional measurement system, which comprises: a processor, a projector and a camera; wherein:

the processor is used for converting a total number of levels of sawtooth fringes in each sawtooth fringe image into a Gray code, and acquiring a sawtooth slope coefficient of each sawtooth fringe according to each bit code value in the Gray code; and fusing the sawtooth slope coefficient into the sawtooth fringe image to generate a plurality of target sawtooth fringe patterns fused with the Gray code, wherein the target sawtooth fringe pattern is:

$$I_n(u, v) = A(u, v) + B(u, v) \times \{g_n(u, v) \times k_n(u, v) \times \varphi(u, v) + b_n(u, v)\};$$

wherein $I_n(u, v)$ is an $n^{th}$ target sawtooth fringe pattern, $(u, v)$ is pixel point coordinates, $A(u, v)$ is an average intensity, $B(u, v)$ is a modulation intensity, $g_n(u, v)$ is a sawtooth slope coefficient of a sawtooth fringe of an $n^{th}$ sawtooth fringe image, $k_n(u, v)$ is a slope of a sawtooth fringe of the $n^{th}$ target sawtooth fringe pattern, $$\varphi(u, v) = \left[\mathrm{mod}(u, T) - \frac{T}{2}\right]$$

is a modulated phase of the target sawtooth fringe pattern, $\mathrm{mod}(\cdot)$ is a complementary function, $T$ is a number of pixels of a single-period fringe of the sawtooth fringe image, and $b_n(u, v)$ is a basic offset of the sawtooth fringe of the $n^{th}$ target sawtooth fringe pattern;

the projector is used for projecting each target sawtooth fringe pattern to a surface of a to-be-measured object;

the camera is used for collecting a deformed target sawtooth fringe pattern on the surface of the to-be-measured object, so as to obtain a sawtooth fringe collection pattern;

the processor is further used for solving a Gray code of each sawtooth fringe collection pattern at each pixel point according to a differential property of adjacent pixels in each sawtooth fringe collection pattern; solving a fringe level and a wrapped phase at each pixel point through the Gray code of each sawtooth fringe collection pattern at each pixel point and each sawtooth fringe collection pattern; calculating an absolute phase at each pixel point according to the fringe level and the wrapped phase at each pixel point; and reconstructing a three-dimensional point cloud through triangulation ranging based on the absolute phase at each pixel point, so as to obtain a three-dimensional model of the to-be-measured object.

Optionally, a calculation formula of the absolute phase is:

$$U(x, y) = \varphi'(x, y) + K(x, y) \times T + \frac{T}{2};$$

wherein $U(x, y)$ is an absolute phase at a pixel point $(x, y)$, $\varphi(x, y)$ is a wrapped phase at the pixel point $(x, y)$, and $K(x, y)$ is a fringe level at the pixel point $(x, y)$.

A third aspect of the present application provides a three-dimensional measurement device, wherein the device comprises a processor and a storage;

the storage is used for storing a program code and transmitting the program code to the processor; and the processor is used for executing the three-dimensional measurement method in the first aspect according to an instruction in the program code.

A fourth aspect of the present application provides a computer-readable storage medium, wherein the computer-readable storage medium is used for storing a program code, and the program code, when executed by a processor, realizes the three-dimensional measurement method in the first aspect.

It can be seen from the technical solution above that the present application has the following advantages:

the present application provides the three-dimensional measurement method, in which the total number of levels of sawtooth fringes is converted into the Gray code, then the sawtooth slope coefficient of each sawtooth fringe is acquired, and the sawtooth slope coefficient of each sawtooth fringe is fused into the sawtooth fringe pattern to generate the plurality of target sawtooth fringe patterns fused with the Gray code, and since the Gray code is fused into each period of fringe for solving the fringe level, it is not necessary to project a large number of target sawtooth fringe patterns in pattern projection, and a projection time and a solution time can be reduced compared with a conventional time phase unwrapping method; and moreover, the Gray code is solved according to the differential property of adjacent pixels in the sawtooth fringe collection pattern, and the absolute phase is solved pixel by pixel, so that a solution accuracy of the fringe level is ensured, and an accuracy and reliability of solving the absolute phase can be improved compared with a conventional spatial phase unwrapping method, and it is not necessary to perform the tangent and arctangent calculations in a solution process, so that a solution speed is further improved, thus improving an efficiency of three-dimensional reconstruction, and improving the technical problems of low solution accuracy of the absolute phase in the existing spatial coding method and slow processing speed in the time coding method.

DESCRIPTION OF THE DRAWINGS

In order to illustrate the technical solution in the embodiments of the present application or the prior art more clearly, the drawings which need to be used in describing the embodiments or the prior art will be briefly introduced hereinafter. Apparently, the drawings described hereinafter are only some embodiments of the present application, those of ordinary skills in the art may obtain other drawings according to these drawings without going through any creative work.

DETAILED DESCRIPTION OF PREFERRED EMBODIMENTS

The present application provides a three-dimensional measurement method and a related apparatus for improving the technical problems of low solution accuracy of an absolute phase in an existing space coding method and low processing speed in a time coding method.

In order to make those skilled in the art better understand the solution of the present application, the technical solution in the embodiments of the present application is clearly and completely described with reference to the drawings in the embodiments of the present application. Apparently, the described embodiments are merely some but not all of the embodiments of the present application. Based on the embodiments of the present application, all other embodiments obtained by those of ordinary skills in the art without going through any creative work should fall within the scope of protection of the present application.

Figure 1:
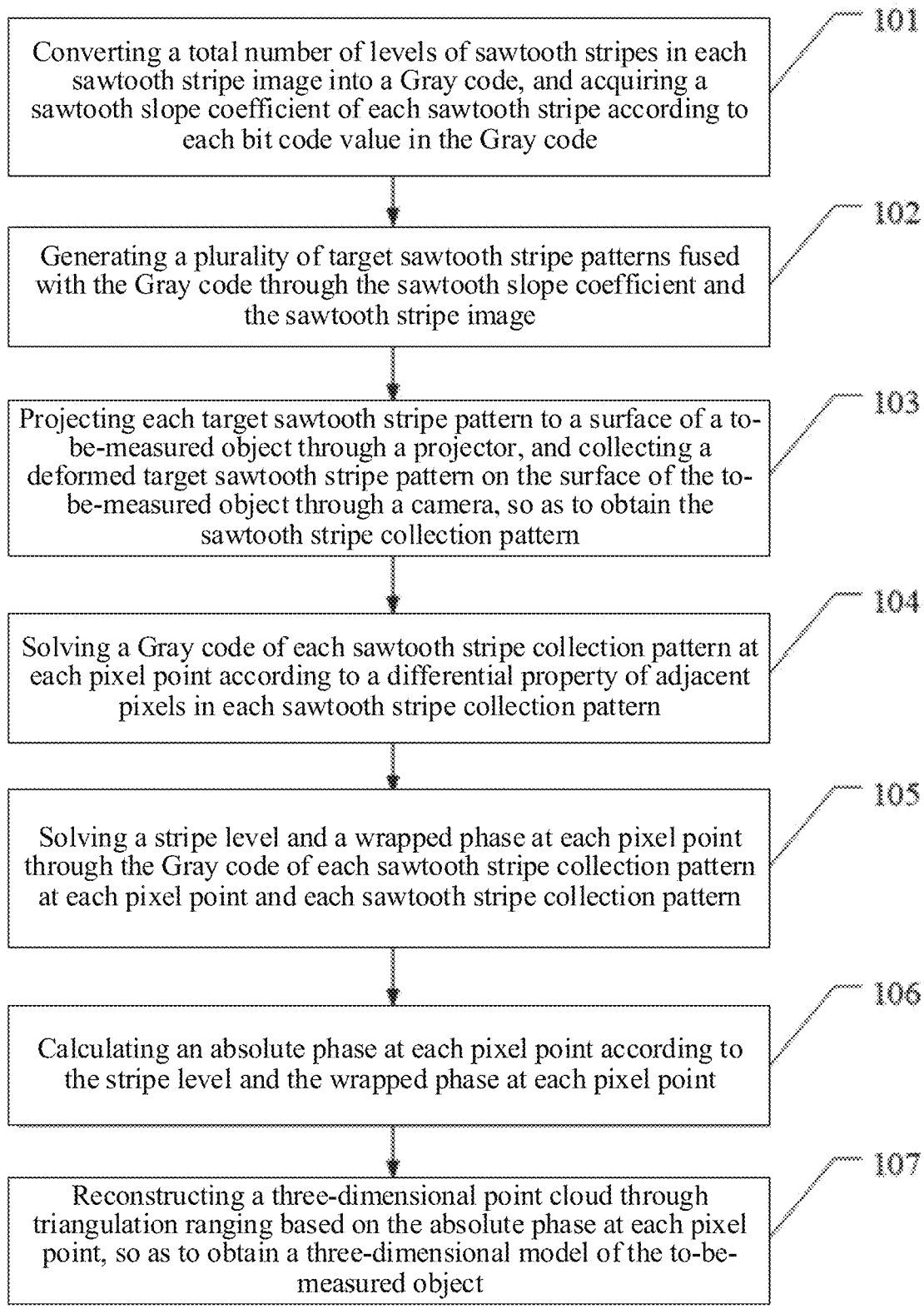
FIG. 1 is a flow chart of a three-dimensional measurement method provided by an embodiment of the present application.

For easy understanding, with reference to FIG. 1, an embodiment of the present application provides a three-dimensional measurement method, which comprises the following steps.

In step 101, a total number of levels of sawtooth fringes in each sawtooth fringe image is converted into a Gray code, and a sawtooth slope coefficient of each sawtooth fringe is acquired according to each bit code value in the Gray code.

The total number of levels of sawtooth fringes in each sawtooth fringe image is converted from a decimal number to the Gray code, and then the sawtooth slope coefficient of each sawtooth fringe is acquired according to each bit code value in the Gray code. By using a characteristic that each bit code value in the Gray code is 0 or 1, positive or negative sawtooth slope of the sawtooth fringe is represented by the bit code value in the Gray code. When a certain bit code value in the Gray code is 0, the sawtooth slope coefficient corresponding to the bit code value is configured to be positive, and when the certain bit code value in the Gray code is 1, the sawtooth slope coefficient corresponding to the bit code value is configured to be negative. Specifically, the sawtooth slope coefficient of the sawtooth fringe is acquired through a conversion formula according to each bit code value in the Gray code, wherein the conversion formula is:

$$g_n(u, v) = \begin{cases} 1, & DtoG\left[\text{Floor}\left(\frac{u}{T}\right), n\right] = 0 \\ -1, & DtoG\left[\text{Floor}\left(\frac{u}{T}\right), n\right] = 1 \end{cases};$$

wherein (u, v) is pixel point coordinates, $g_n(u, v)$ is the sawtooth slope coefficient of the sawtooth fringe of the $n^{th}$ sawtooth fringe image, $DtoG[\cdot, n]$ is an $n^{th}$ bit code value in the Gray code of the total number of levels converted from the decimal number, $\text{Floor}(\cdot)$ is a rounding function, and T is a number of pixels of a single-period fringe of the sawtooth fringe image.

In step 102, a plurality of target sawtooth fringe patterns fused with the Gray code are generated through the sawtooth slope coefficient and the sawtooth fringe image.

Figure 2:
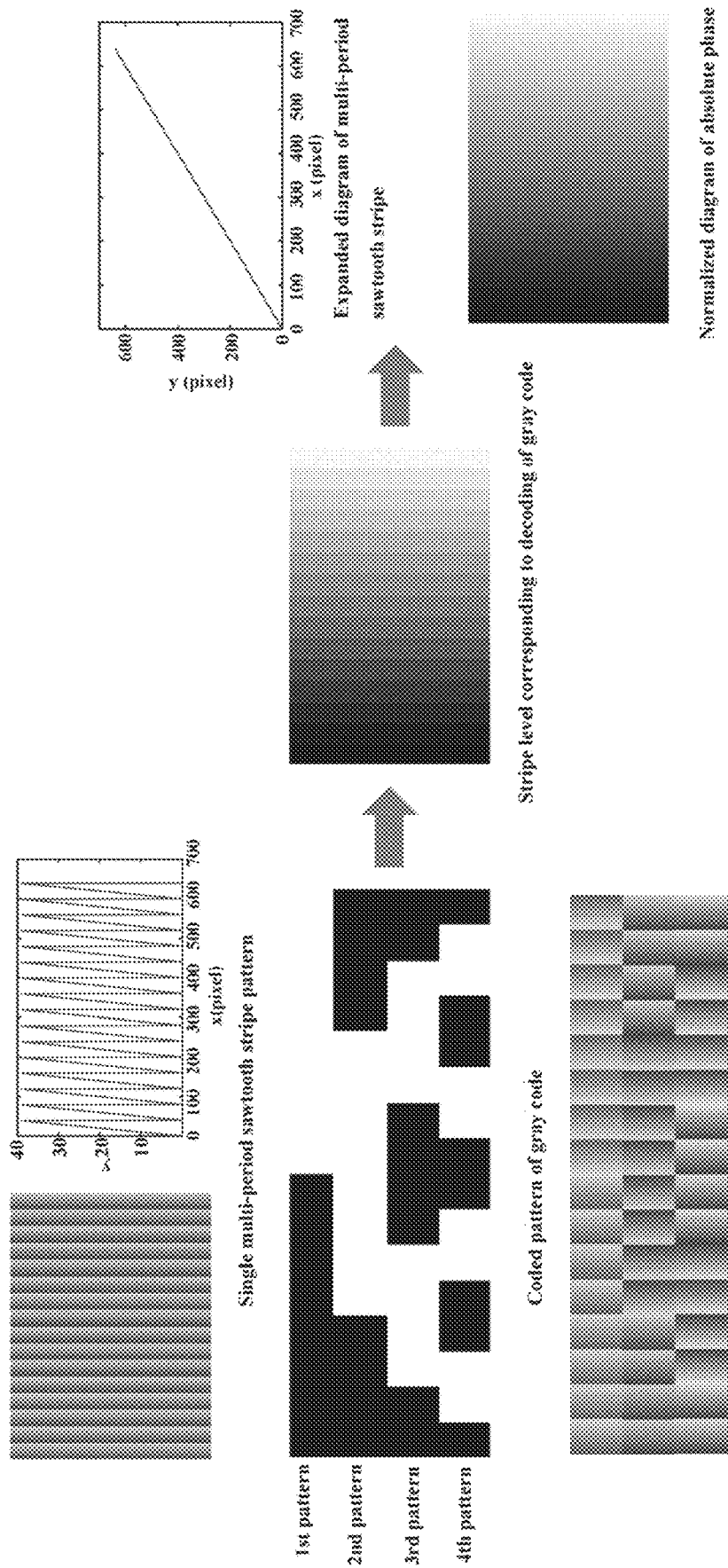
FIG. 2 is a visual diagram of a solution process of an absolute phase provided by an embodiment of the present application.

N target sawtooth fringe patterns fused with the Gray code generated through the sawtooth slope coefficient and the sawtooth fringe image may refer to a sawtooth fringe pattern fused with the Gray code may be provided in FIG. 2. After the total number of levels of sawtooth fringes is converted into the Gray code, the Gray code is fused into the sawtooth fringe pattern, so that the fringe level is coded, so as to obtain the target sawtooth fringe pattern. Each periodic fringe of the sawtooth fringe is fused with a one-bit code value in the Gray code, and the same fringe period of N target sawtooth fringe patterns corresponds to one N-bit Gray code. The target sawtooth fringe pattern may be represented as:

$$I_n(u, v) = A(u, v) + B(u, v) \times \{g_n(u, v) \times k_n(u, v) \times \varphi(u, v) + b_n(u, v)\};$$

wherein $I_n(u, v)$ is an $n^{th}$ target sawtooth fringe pattern, (u, v) is pixel point coordinates, $A(u, v)$ is an average intensity, $B(u, v)$ is a modulation intensity, $g_n(u, v)$ is a sawtooth slope coefficient of a sawtooth fringe of an $n^{th}$ sawtooth fringe image, $k_n(u, v)$ is a slope of a sawtooth fringe of the $n^{th}$ target sawtooth fringe pattern, $$\varphi(u, v) = \left[\text{mod}(u, T) - \frac{T}{2}\right]$$

is a modulated phase of the target sawtooth fringe pattern, $\text{mod}(\cdot)$ is a complementary function, and $b_n(u, v)$ is a basic offset of the sawtooth fringe of the $n^{th}$ target sawtooth fringe pattern.

In step 103, each target sawtooth fringe pattern is projected to a surface of a to-be-measured object through a projector, and a deformed target sawtooth fringe pattern on the surface of the to-be-measured object is collected through a camera, so as to obtain a sawtooth fringe collection pattern.

Each target sawtooth fringe pattern is projected to the surface of the to-be-measured object through the projector, and the deformed target sawtooth fringe pattern on the surface of the to-be-measured object is collected through the camera, so as to obtain the sawtooth fringe collection pattern. The sawtooth fringe collection pattern may be represented as:

$$I'_n(x, y) = A'(x, y) + B'(x, y) \times \{g'_n(x, y) \times k'_n(x, y) \times \varphi'(x, y) + b'_n(x, y)\};$$

wherein $I_n(x, y)$ is an $n^{th}$ sawtooth fringe collection pattern, $A'(x, y)$ is an average intensity of the sawtooth fringe collection pattern at the pixel point (x, y), $B'(x, y)$ is a modulation intensity of the sawtooth fringe collection pattern at the pixel point (x, y), $g'_n(x, y)$ is a sawtooth slope coefficient of the $n^{th}$ sawtooth fringe collection pattern at the pixel point (x, y), k'$_n$(x, y) is a slope of a sawtooth fringe of the n$^{th}$ sawtooth fringe collection pattern at the pixel point (x, y), φ'(x, y) is a wrapped phase of the sawtooth fringe of the sawtooth fringe collection pattern, and b'$_n$(x, y) is a basic offset of the sawtooth fringe of the n$^{th}$ sawtooth fringe collection pattern at the pixel point (x, y).

In step 104, a Gray code of each sawtooth fringe collection pattern at each pixel point is solved according to a differential property of adjacent pixels in each sawtooth fringe collection pattern.

A differential result G$_{nSub}$(x, y) of each sawtooth fringe collection pattern at each pixel point is acquired according to the differential property of adjacent pixels in each sawtooth fringe collection pattern, that is:

$$G_{nSub}(x, y) = I'_n(x+1, y) - I'_n(x, y).$$

Binarization is performed on the differential result of each sawtooth fringe collection pattern at each pixel point, so as to obtain the Gray code fused into each sawtooth fringe collection pattern at each pixel point, that is:

$$G_n(x, y) = \begin{cases} 1, & G_{nSub}(x, y) < 0 \text{ or } G_{nSub}(x, y) > M \\ 0, & G_{nSub}(x, y) > 0 \text{ or } G_{nSub}(x, y) < -M \end{cases}.$$

G$_n$(x, y) is a Gray code fused into the n$^{th}$ sawtooth fringe collection pattern at the pixel point (x, y), and except for a possibility of jumping at a periodic edge of the sawtooth fringe, Gray codes fused into other adjacent pixels are equal. M is a set threshold, and is used for identifying the jumping at the periodic edge of the sawtooth fringe.

In the embodiment of the present application, it is only necessary to refer to gray values of adjacent pixels when the Gray code is solved, so that a solution accuracy of the fringe level is ensured.

In step 105, a fringe level and a wrapped phase at each pixel point are solved through the Gray code of each sawtooth fringe collection pattern at each pixel point and each sawtooth fringe collection pattern.

The Gray code of each sawtooth fringe collection pattern at each pixel point is converted into the decimal number, so as to obtain the fringe level K(x, y) of each sawtooth fringe collection pattern at each pixel point, that is:

$$K(x, y) = GtoD[G_0(x, y), G_1(x, y), \ldots, G_{N-1}(x, y),];$$

wherein GtoD[·] is a function of converting the Gray code into the decimal number.

The sawtooth slope coefficient of each sawtooth fringe collection pattern at each pixel point is acquired according to the Gray code of each sawtooth fringe collection pattern at each pixel point, that is:

$$g'_n(x, y) = \begin{cases} 1, & G_n(x, y) = 0 \\ -1, & G_n(x, y) = 1 \end{cases}.$$

The sawtooth slope coefficient of each sawtooth fringe collection pattern at each pixel point is combined with each sawtooth fringe collection pattern to form an equation set, so as to obtain the wrapped phase at the pixel point by solving the equation set. The equation set is:

$$\begin{bmatrix} 1 & g'_0(x,y) \times k'_0(x,y) & b'_0(x,y) \\ 1 & g'_1(x,y) \times k'_1(x,y) & b'_1(x,y) \\ \vdots & \vdots & \vdots \\ 1 & g'_{N-1}(x,y) \times k'_{N-1}(x,y) & b'_{N-1}(x,y) \end{bmatrix} \begin{bmatrix} A'(x,y) \\ B'(x,y) \times \varphi'(x,y) \\ B'(x,y) \end{bmatrix} =$$

$$\begin{bmatrix} I'_0(x,y) \\ I'_1(x,y) \\ \vdots \\ I'_{N-1}(x,y) \end{bmatrix}.$$

When $$O = \begin{bmatrix} 1 & g'_0(x,y) \times k'_0(x,y) & b'_0(x,y) \\ 1 & g'_1(x,y) \times k'_1(x,y) & b'_1(x,y) \\ \vdots & \vdots & \vdots \\ 1 & g'_{N-1}(x,y) \times k'_{N-1}(x,y) & b'_{N-1}(x,y) \end{bmatrix},$$

$$Q = \begin{bmatrix} A'(x,y) \\ B'(x,y) \times \varphi'(x,y) \\ B'(x,y) \end{bmatrix} \text{ and } L = \begin{bmatrix} I'_0(x,y) \\ I'_1(x,y) \\ \vdots \\ I'_{N-1}(x,y) \end{bmatrix},$$

Q=(O$^T$O)$^{-1}$O$^T$×L may be solved, and then the wrapped phase $$\varphi'(x, y) = \frac{B'(x, y) \times \varphi'(x, y)}{B'(x, y)} = \frac{Q(2)}{Q(3)}$$

at each pixel point is solved.

In step 106, an absolute phase at each pixel point is calculated according to the fringe level and the wrapped phase at each pixel point.

The absolute phase at each pixel point is calculated through a calculation formula of the absolute phase according to the fringe level and the wrapped phase at each pixel point, which may refer to each visual diagram of a solution process of the absolute phase in FIG. 2.

The calculation formula of the absolute phase is:

$$U(x, y) = \varphi'(x, y) + K(x, y) \times T + \frac{T}{2};$$

wherein U(x, y) is an absolute phase at the pixel point (x, y), φ'(x, y) is a wrapped phase at the pixel point (x, y), K(x, y) is a fringe level at the pixel point (x, y), and T is a number of pixels of a single-period fringe of the sawtooth fringe image.

In step 107, a three-dimensional point cloud is reconstructed through triangulation ranging based on the absolute phase at each pixel point, so as to obtain a three-dimensional model of the to-be-measured object.

After phase information representing a height of each point of the object is calculated, the three-dimensional point cloud may be reconstructed through the triangulation ranging according to the phase information and calibration parameters of the camera, so as to obtain the three-dimensional model of the to-be-measured object. A specific reconstruction process belongs to the prior art, which will not be repeated herein.

In the embodiment of the present application, the total number of levels of sawtooth fringes is converted into the Gray code, then the sawtooth slope coefficient of each sawtooth fringe is acquired, and the sawtooth slope coefficient of each sawtooth fringe is fused into the sawtooth fringe pattern to generate the plurality of target sawtooth fringe patterns fused with the Gray code, and since the Gray code is fused into each period of fringe for solving the fringe level, it is not necessary to project a large number of target sawtooth fringe patterns in pattern projection, and a projection time and a solution time can be reduced compared with a conventional time phase unwrapping method; and moreover, the Gray code is solved according to the differential property of adjacent pixels in the sawtooth fringe collection pattern, and the absolute phase is solved pixel by pixel, so that a solution accuracy of the fringe level is ensured, and an accuracy and reliability of solving the absolute phase can be improved compared with a conventional spatial phase unwrapping method, and it is not necessary to perform the tangent and arctangent calculations in a solution process, so that a solution speed is further improved, thus improving an efficiency of three-dimensional reconstruction, and improving the technical problems of low solution accuracy of the absolute phase in the existing spatial coding method and slow processing speed in the time coding method.

The above is one embodiment of a three-dimensional measurement method provided by the present application, and the following is one embodiment of a three-dimensional measurement system provided by the present application.

The embodiment of the present application provides a three-dimensional measurement system, which comprises: a processor, a projector and a camera.

The processor is used for converting a total number of levels of sawtooth fringes in each sawtooth fringe image into a Gray code, and acquiring a sawtooth slope coefficient of each sawtooth fringe according to each bit code value in the Gray code; and fusing the sawtooth slope coefficient into the sawtooth fringe image to generate a plurality of target sawtooth fringe patterns fused with the Gray code, wherein the target sawtooth fringe pattern is:

$$I_n(u, v) = A(u, v) + B(u, v) \times \{g_n(u, v) \times k_n(u, v) \times \varphi(u, v) + b_n(u, v)\};$$

wherein $I_n(u, v)$ is an $n^{th}$ target sawtooth fringe pattern, (u, v) is pixel point coordinates, $A(u, v)$ is an average intensity, $B(u, v)$ is a modulation intensity, $g_n(u, v)$ is a sawtooth slope coefficient of a sawtooth fringe of an $n^{th}$ sawtooth fringe image, $k_n(u, v)$ is a slope of a sawtooth fringe of the $n^{th}$ target sawtooth fringe pattern, $$\varphi(u, v) = \left[\mathrm{mod}(u, T) - \frac{T}{2}\right]$$

is a modulated phase of the target sawtooth fringe pattern, mod(·) is a complementary function, T is a number of pixels of a single-period fringe of the sawtooth fringe image, and $b_n(u, v)$ is a basic offset of the sawtooth fringe of the $n^{th}$ target sawtooth fringe pattern.

The projector is used for projecting each target sawtooth fringe pattern to a surface of a to-be-measured object.

The camera is used for collecting a deformed target sawtooth fringe pattern on the surface of the to-be-measured object, so as to obtain a sawtooth fringe collection pattern.

The processor is further used for solving a Gray code of each sawtooth fringe collection pattern at each pixel point according to a differential property of adjacent pixels in each sawtooth fringe collection pattern; solving a fringe level and a wrapped phase at each pixel point through the Gray code of each sawtooth fringe collection pattern at each pixel point and each sawtooth fringe collection pattern; calculating an absolute phase at each pixel point according to the fringe level and the wrapped phase at each pixel point; and reconstructing a three-dimensional point cloud through triangulation ranging based on the absolute phase at each pixel point, so as to obtain a three-dimensional model of the to-be-measured object.

As a further improvement, the calculation formula of the absolute phase is:

$$U(x, y) = \varphi'(x, y) + K(x, y) \times T + \frac{T}{2};$$

wherein $U(x, y)$ is an absolute phase at a pixel point (x, y), $\varphi'(x, y)$ is a wrapped phase at the pixel point (x, y), and $K(x, y)$ is a fringe level at the pixel point (x, y).

In the embodiment of the present application, the total number of levels of sawtooth fringes is converted into the Gray code, then the sawtooth slope coefficient of each sawtooth fringe is acquired, and the sawtooth slope coefficient of each sawtooth fringe is fused into the sawtooth fringe pattern to generate the plurality of target sawtooth fringe patterns fused with the Gray code, and since the Gray code is fused into each period of fringe for solving the fringe level, it is not necessary to project a large number of target sawtooth fringe patterns in pattern projection, and a projection time and a solution time can be reduced compared with a conventional time phase unwrapping method; and moreover, the Gray code is solved according to the differential property of adjacent pixels in the sawtooth fringe collection pattern, and the absolute phase is solved pixel by pixel, so that a solution accuracy of the fringe level is ensured, and an accuracy and reliability of solving the absolute phase can be improved compared with a conventional spatial phase unwrapping method, and it is not necessary to perform the tangent and arctangent calculations in a solution process, so that a solution speed is further improved, thus improving an efficiency of three-dimensional reconstruction, and improving the technical problems of low solution accuracy of the absolute phase in the existing spatial coding method and slow processing speed in the time coding method.

The embodiment of the present application further provides a three-dimensional measurement device, wherein the device comprises a processor and a storage.

The storage is used for storing a program code and transmitting the program code to the processor.

The processor is used for executing the three-dimensional measurement method in the method embodiment above according to an instruction in the program code.

The embodiment of the present application further provides a computer-readable storage medium, wherein the computer-readable storage medium is used for storing a program code, and the program code, when executed by a processor, realizes the three-dimensional measurement method in the method embodiment above.

It can be clearly understood by those skilled in the art that, for convenient and brief description, a specific working process of the foregoing system may refer to a corresponding process in the method embodiment above, which will not be repeated herein.

The terms "first", "second", "third", "fourth", and the like (if any) in the specification and the drawings of the present application above are used to distinguish similar objects, and are not necessarily used to describe a specific order or sequence. It should be understood that data used in this way may be interchanged under appropriate circumstances, so that the embodiments of the present application described herein can be implemented in a sequence other than those illustrated or described herein. In addition, the terms "comprising", "having" and any variations thereof are intended to cover non-exclusive inclusion. For example, a process, method, system, product or device including a series of steps or units is not necessarily limited to those steps or units clearly listed, but may comprise other steps or units not clearly listed in or inherent to the process, method, product or device.

It should be understood that, in the present application, "at least one (item)" refers to being one or more, and "multiple" refers to being two or more. "And/or" is used for describing the relationship between related objects, and indicates that there may be three relationships. For example, "A and/or B" may indicate that: A exists alone, B exists alone, and A and B exist at the same time, wherein A and B may be singular or plural. The symbol "/" generally indicates that there is a relationship of "or" between the related objects. "At least one (item) of the followings" or similar expression thereof refers to any combination of these items, comprising a singular (item) or any combination of plural (items). For example, at least one (item) of a, b or c may indicate: a, b, c, "a and b", "a and c", "b and c", or "a and b and c", wherein a, b and c may be singular or plural.

As described above, the embodiments above are only used to illustrate the technical solution of the present application, and are not intended to limit the present application. Although the present application has been described in detail with reference to the above-mentioned embodiments, those of ordinary skills in the art should understand that the technical solutions set forth by the above-mentioned embodiments can still be modified, or equivalent substitutions can be made to part of the technical features in the embodiments. However, these modifications or substitutions should not depart from the spirit and scope of the technical solutions of the embodiments of the present application.

We claim:

1. A three-dimensional measurement method, comprising:
converting a total number of levels of sawtooth fringes in a sawtooth fringe image of n sawtooth fringe images into a Gray code, and acquiring a sawtooth slope coefficient of each sawtooth fringe according to each bit code value in the Gray code;
fusing the sawtooth slope coefficient into the sawtooth fringe image to generate a plurality of target sawtooth fringe patterns fused with the Gray code, wherein the target sawtooth fringe pattern is:

$$I_n(u, v) = A(u, v) + B(u, v) \times \{g_n(u, v) \times k_n(u, v) \times \varphi(u, v) + b_n(u, v)\};$$

wherein $I_n(u, v)$ is an $n^{th}$ target sawtooth fringe pattern, n=0, 1, 2, ..., N−1, N is a total number of the target sawtooth fringe patterns, (u, v) is pixel point coordinates, $A(u, v)$ is an average intensity, $B(u, v)$ is a modulation intensity, $g_n(u, v)$ is a sawtooth slope coefficient of a sawtooth fringe of an $n^{th}$ sawtooth fringe image, $k_n(u, v)$ is a slope of a sawtooth fringe of the $n^{th}$ target sawtooth fringe pattern, $$\varphi(u, v) = \left[\mathrm{mod}(u, T) - \frac{T}{2}\right]$$

is a modulated phase of the target sawtooth fringe pattern, mod(u, T) is a complementary function, T is a number of pixels of a single-period fringe of the sawtooth fringe image, and $b_n(u, v)$ is a basic offset of the sawtooth fringe of the $n^{th}$ target sawtooth fringe pattern;

projecting each target sawtooth fringe pattern to a surface of a to-be-measured object through a projector, and collecting a deformed target sawtooth fringe pattern on the surface of the to-be-measured object through a camera, so as to obtain a sawtooth fringe collection pattern;
solving a Gray code of each sawtooth fringe collection pattern at each pixel point according to a differential property of adjacent pixels in each sawtooth fringe collection pattern;
solving a fringe level and a wrapped phase at each pixel point through the Gray code of each sawtooth fringe collection pattern at each pixel point and each sawtooth fringe collection pattern;
calculating an absolute phase at each pixel point according to the fringe level and the wrapped phase at each pixel point; and
reconstructing a three-dimensional point cloud through triangulation ranging based on the absolute phase at each pixel point, so as to obtain a three-dimensional model of the to-be-measured object;
wherein the acquiring the sawtooth slope coefficient of the sawtooth fringe according to each bit code value in the Gray code, comprises:
acquiring the sawtooth slope coefficient of the sawtooth fringe through a conversion formula according to each bit code value in the Gray code, wherein the conversion formula is:

$$g_n(u, v) = \begin{cases} 1, & DtoG\left[\mathrm{Floor}\left(\frac{u}{T}\right), n\right] = 0 \\ -1, & DtoG\left[\mathrm{Floor}\left(\frac{u}{T}\right), n\right] = 1 \end{cases};$$

wherein (u, v) is pixel point coordinates, $g_n(u, v)$ is the sawtooth slope coefficient of the sawtooth fringe of the $n^{th}$ sawtooth fringe image, $$DtoG\left[\mathrm{Floor}\left(\frac{u}{T}\right), n\right]$$

is an $n^{th}$ bit code value in the Gray code of the total number of levels converted from a decimal number, n=0, 1, 2, ..., N−1, and $$\mathrm{Floor}\left(\frac{u}{T}\right)$$

is a rounding function.

2. The three-dimensional measurement method according to claim 1, wherein the solving the Gray code of each sawtooth fringe collection pattern according to the differential property of adjacent pixels in each sawtooth fringe collection pattern, comprises:
acquiring a differential result of each sawtooth fringe collection pattern at each pixel point according to the differential property of adjacent pixels in each sawtooth fringe collection pattern; and
performing binarization on the differential result of each sawtooth fringe collection pattern at each pixel point, so as to obtain the Gray code fused into each sawtooth fringe collection pattern at each pixel point.

3. The three-dimensional measurement method according to claim 1, wherein the solving the fringe level and the wrapped phase at each pixel point through the Gray code of each sawtooth fringe collection pattern at each pixel point and each sawtooth fringe collection pattern, comprises:
   converting the Gray code of each sawtooth fringe collection pattern at each pixel point into the decimal number, so as to obtain the fringe level of each sawtooth fringe collection pattern at each pixel point;
   acquiring the sawtooth slope coefficient of each sawtooth fringe collection pattern at each pixel point according to the Gray code of each sawtooth fringe collection pattern at each pixel point; and
   combining the sawtooth slope coefficient of each sawtooth fringe collection pattern at each pixel point with each sawtooth fringe collection pattern to form an equation set, so as to obtain the wrapped phase at each pixel point by solving the equation set.

4. The three-dimensional measurement method according to claim 1, wherein a calculation formula of the absolute phase is:

$$U(x, y) = \varphi'(x, y) + K(x, y) \times T + \frac{T}{2};$$

wherein $U(x, y)$ is an absolute phase at a pixel point $(x, y)$, $\varphi'(x, y)$ is a wrapped phase at the pixel point $(x, y)$, and $K(x, y)$ is a fringe level at the pixel point $(x, y)$.

5. A three-dimensional measurement system, comprising: a processor, a projector and a camera; wherein:
   the processor is used for converting a total number of levels of sawtooth fringes in a sawtooth fringe image of n sawtooth fringe images into a Gray code, and acquiring a sawtooth slope coefficient of each sawtooth fringe according to each bit code value in the Gray code; and
   fusing the sawtooth slope coefficient into the sawtooth fringe image to generate a plurality of target sawtooth fringe patterns fused with the Gray code, wherein the target sawtooth fringe pattern is:

$I_n = A(u, v) + B(u, v) \times \{g_n(u, v) \times k_n(u, v) \times \varphi(u, v) + b_n(u, v)\}$;

wherein $I_n(u, v)$ is an $n^{th}$ target sawtooth fringe pattern, $n = 0, 1, 2, \ldots, N-1$, N is a total number of the target sawtooth fringe patterns, $(u, v)$ is pixel point coordinates, $A(u, v)$ is an average intensity, $B(u, v)$ is a modulation intensity, $g_n(u, v)$ is a sawtooth slope coefficient of a sawtooth fringe of an $n^{th}$ sawtooth fringe image, $k_n(u, v)$ is a slope of a sawtooth fringe of the $n^{th}$ target sawtooth fringe pattern, $$\varphi(u, v) = \left[\mathrm{mod}(u, T) - \frac{T}{2}\right]$$

is a modulated phase of the target sawtooth fringe pattern, $\mathrm{mod}(u, T)$ is a complementary function, T is a number of pixels of a single-period fringe of the sawtooth fringe image, and $b_n(u, v)$ is a basic offset of the sawtooth fringe of the $n^{th}$ target sawtooth fringe pattern;
   the projector is used for projecting each target sawtooth fringe pattern to a surface of a to-be-measured object;
   the camera is used for collecting a deformed target sawtooth fringe pattern on the surface of the to-be-measured object, so as to obtain a sawtooth fringe collection pattern;

the processor is further used for solving a Gray code of each sawtooth fringe collection pattern at each pixel point according to a differential property of adjacent pixels in each sawtooth fringe collection pattern; solving a fringe level and a wrapped phase at each pixel point through the Gray code of each sawtooth fringe collection pattern at each pixel point and each sawtooth fringe collection pattern; calculating an absolute phase at each pixel point according to the fringe level and the wrapped phase at each pixel point; and reconstructing a three-dimensional point cloud through triangulation ranging based on the absolute phase at each pixel point, so as to obtain a three-dimensional model of the to-be-measured object;
wherein the acquiring the sawtooth slope coefficient of the sawtooth fringe according to each bit code value in the Gray code, comprises:
   acquiring the sawtooth slope coefficient of the sawtooth fringe through a conversion formula according to each bit code value in the Gray code, wherein the conversion formula is:

$$g_n(u, v) = \begin{cases} 1, & DtoG\left[\mathrm{Floor}\left(\frac{u}{T}\right), n\right] = 0 \\ -1, & DtoG\left[\mathrm{Floor}\left(\frac{u}{T}\right), n\right] = 1 \end{cases};$$

wherein $(u, v)$ is pixel point coordinates, $g_n(u, v)$ is the sawtooth slope coefficient of the sawtooth fringe of the $n^{th}$ sawtooth fringe image, $$DtoG\left[\mathrm{Floor}\left(\frac{u}{T}\right), n\right]$$

is an $n^{th}$ bit code value in the Gray code of the total number of levels converted from a decimal number, $n = 0, 1, 2, \ldots, N-1$, and $$\mathrm{Floor}\left(\frac{u}{T}\right)$$

is a rounding function.

6. The three-dimensional measurement system according to claim 5, wherein a calculation formula of the absolute phase is:

$$U(x, y) = \varphi'(x, y) + K(x, y) \times T + \frac{T}{2};$$

wherein $U(x, y)$ is an absolute phase at a pixel point $(x, y)$, $\varphi'(x, y)$ is a wrapped phase at the pixel point $(x, y)$, and $K(x, y)$ is a fringe level at the pixel point $(x, y)$.

7. A three-dimensional measurement device, wherein the device comprises a processor and a storage;
   the storage is used for storing a program code and transmitting the program code to the processor; and
   the processor is used for executing the three-dimensional measurement method according to claim 1 according to an instruction in the program code.

* * * * *